US007639987B2

(12) United States Patent
Kim et al.

(10) Patent No.: US 7,639,987 B2
(45) Date of Patent: Dec. 29, 2009

(54) METHOD AND APPARATUS FOR MODIFYING A RADIO FREQUENCY RESPONSE

(75) Inventors: Seong-Hwoon Kim, Ocoee, FL (US); Vernon T. Brady, Orlando, FL (US); Paul M. Nguyen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 771 days.

(21) Appl. No.: 10/525,072

(22) PCT Filed: Aug. 20, 2003

(86) PCT No.: PCT/US03/25876

§ 371 (c)(1), (2), (4) Date: Aug. 12, 2005

(87) PCT Pub. No.: WO2004/019508

PCT Pub. Date: Mar. 4, 2004

(65) Prior Publication Data

US 2006/0116083 A1 Jun. 1, 2006

Related U.S. Application Data

(60) Provisional application No. 60/404,392, filed on Aug. 20, 2002.

(51) Int. Cl.
*H04B 17/00* (2006.01)
*H04B 7/00* (2006.01)

(52) U.S. Cl. .................................... 455/67.11; 455/69

(58) Field of Classification Search .................. 455/73, 455/41.2, 42, 260, 313, 67.11, 69, 67.14, 455/140
See application file for complete search history.

(56) References Cited

U.S. PATENT DOCUMENTS

| | | | | |
|---|---|---|---|---|
| 6,101,371 | A | 8/2000 | Barber et al. | |
| 6,181,050 | B1 * | 1/2001 | Taussig et al. | 310/309 |
| 6,236,281 | B1 | 5/2001 | Nguyen et al. | |
| 2002/0012193 | A1 | 1/2002 | Kobayashi et al. | |
| 2002/0173343 | A1 | 11/2002 | Narahashi et al. | |
| 2003/0128495 | A1 | 7/2003 | Obert et al. | |
| 2003/0194984 | A1 | 10/2003 | Toncich et al. | |

FOREIGN PATENT DOCUMENTS

| | | | |
|---|---|---|---|
| EP | 0 516 174 | A | 12/1992 |
| GB | 2 027 299 | A | 2/1980 |
| JP | 05 267908 | A | 10/1993 |

OTHER PUBLICATIONS

Borgioli, A. et al. "Low-Loss Distributed MEMS Phase Shifter." IEEE Microwave and Guided Wave Letters, vol. 10, No. 1, Jan. 2000. IEEE Inc., New York, NY. XP011034890, ISSN: 1051-8207, pp. 7-9.

(Continued)

*Primary Examiner*—Eugene Yun
(74) *Attorney, Agent, or Firm*—Buchanan Ingersoll & Rooney PC

(57) ABSTRACT

The present invention is directed to a method, and associated apparatus, for modifying a radio frequency (RF) response. An exemplary method includes establishing an RF response in a signal path of a device; and controlling an actuator to structurally alter the signal path and dynamically change an impedance of the signal path to alter the RF response.

10 Claims, 3 Drawing Sheets

OTHER PUBLICATIONS

Chang, K. et al., "Novel Low-Cost Beam-Steering Techniques." IEEE Transactions on Antennas and Propagation, vol. 50, No. 5, May 2002. IEEE Service Center, Piscataway, NJ. XP011068519, ISSN: 0018-926X, pp. 618-627.

European Search Report issued Nov. 22, 2007 in European Patent Application No. EP 03 79 3110.2.

International Preliminary Examination Report issued in International Application No. PCT/US03/25876 on Oct. 12, 2004.

Communication pursuant to Article 94(3) EPC issued in European Patent Application No. 03 793 110.2-1248 on Sep. 8, 2008.

* cited by examiner

METHOD AND APPARATUS FOR MODIFYING A RADIO FREQUENCY RESPONSE

BACKGROUND

1. Field

The present invention relates generally to a method and apparatus for modifying a radio frequency response.

2. Background Information

Millimeter wave seekers and advanced radio frequency (RF) concepts have used broadband and agile waveforms in space constrained packages. Dynamically tunable devices have been used to support these waveforms. Broadband and frequency agile systems have used switched banks of RF devices to support the radar waveforms.

SUMMARY

The present invention is directed to a method, and associated apparatus, for modifying a radio frequency (RF) response, comprising: establishing an RF response in a signal path of a device; and controlling an actuator to structurally alter the signal path and dynamically change an impedance of the signal path to alter the RF response.

BRIEF DESCRIPTION OF THE DRAWINGS

Other objects and advantages will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

A method and apparatus for modifying a radio frequency (RF) response are disclosed. For example, the RF response can be the transfer function of a signal path of, for example, a filter, a phase shifter, an attenuator or other device, that is to be modified. An exemplary method includes establishing an RF response in the signal path of a device, and controlling an actuator to structurally alter the signal path and dynamically change an impedance of the signal path to alter the RF response.

Figure 1:
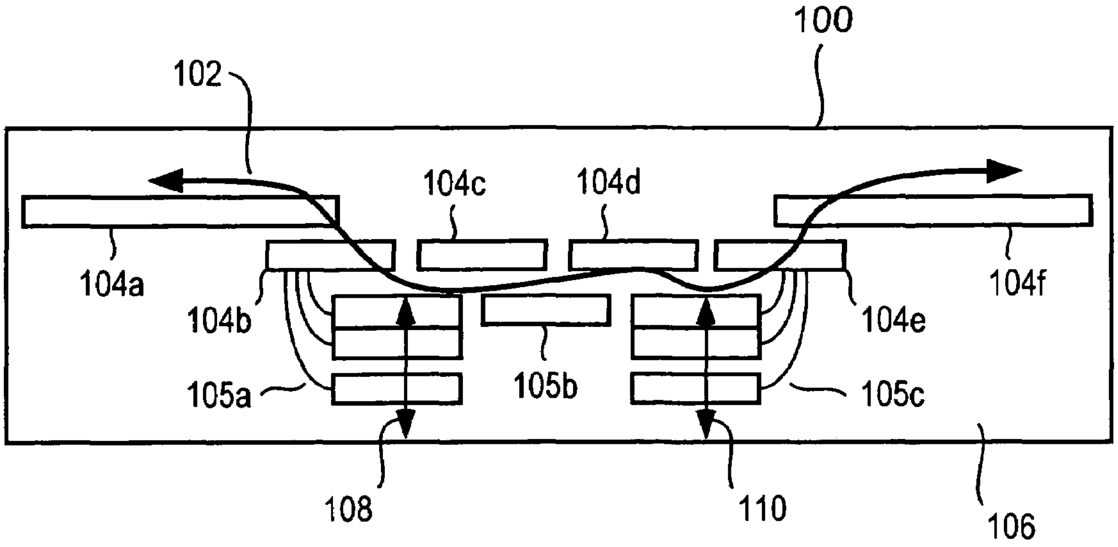
FIG. 1 shows an exemplary apparatus for modifying a radio frequency response.

The method can be implemented using an apparatus such as that of FIG. 1. The FIG. 1 apparatus 100 includes a signal path 102 having an RF transfer function. The signal path can be implemented using any conductive material including, but not limited to, any metallization layers formed among a dielectric 106 (e.g., dielectric layers) using, for example, a suitable CMOS process. The dielectric can, for example, be polysilicon. Those skilled in the art will appreciate that any forming process can be used to produce the FIG. 1 application including both silicon and non-silicon processes in conjunction with formation of metallization layers using any known techniques. The FIG. 1 device can be configured to have dimensions in a range on the order of 10 microns to 100 microns, or larger or smaller as determined by the application.

The FIG. 1 apparatus 100 includes an in situ (i.e., formed in the apparatus) actuator, such as a microelectromechanical system (MEMS) actuator, for tuning the device by changing the RF transfer function of the signal path 102. For example, operating parameters of the RF signal path can be changed dynamically by post machining sections of CMOS circuit elements to create the MEMS actuator. The actuator can thus be controlled to structurally, or mechanically, alter the signal path (i.e., alter physical characteristics) and dynamically change an impedance of the signal path to alter the RF response. That is, the dynamic change occurs in response to external excitation (such as thermal, electrical, or other excitation), whereby the MEMS actuator can be controlled, or adjusted, to structurally change the signal path, and thus alter electrical parameters (such as coupling capacitance, inductance, and so forth) of a transfer function of the signal path, and of the apparatus. A frequency, phase and/or amplitude of a signal received along a signal path can thereby be modified.

Referring to FIG. 1, the signal path 102 is shown to be configured using plural segmented, conductive legs 104*a*-104*f* used to form a segmented path, having cascaded legs, wherein coupling coefficients of the cascaded legs are altered using an actuator. The conductors 104*a*-104*f*, in an exemplary embodiment, constitute fixed point portions of a signal path (i.e., portions of the signal path which remain fixed within the dielectric 106). A second set of one or more conductors 105*a*-105*c* are formed in proximity to the fixed point conductors of the signal path 102 to alter the coupling coefficients. A portion of the dielectric 106 can be partially etched in a vicinity of each of the conductors 105*a*-105*c* to accommodate their movement of the conductors 105*a*-105*c* (e.g., vertical movement in the orientation of the FIG. 1 illustration).

For example, referring to FIG. 1, the arrow 108 illustrates a controlled movement of the conductor 105*a* among three different positions. Similarly, an arrow 110 illustrates a controlled movement of the conductor 105*c* among three different positions. By selectively, and dynamically, moving any one or more of the conductors 105*a*-105*c* among any number of available positions, the impedance of the signal path 102 can be altered, thereby altering the transfer function of the signal path and changing a response of the signal path.

Figure 2:
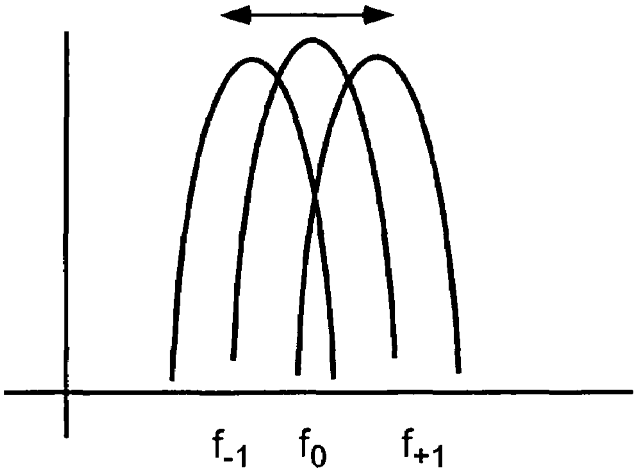
FIG. 2 shows three exemplary frequency responses.

For example, FIG. 2 illustrates three different frequency responses which can be achieved using a common signal path, wherein positions of conductors such as conductors 105*a*-105*c*, have been dynamically relocated. Thus, a filter having a varied transfer function can be obtained.

Figure 3:
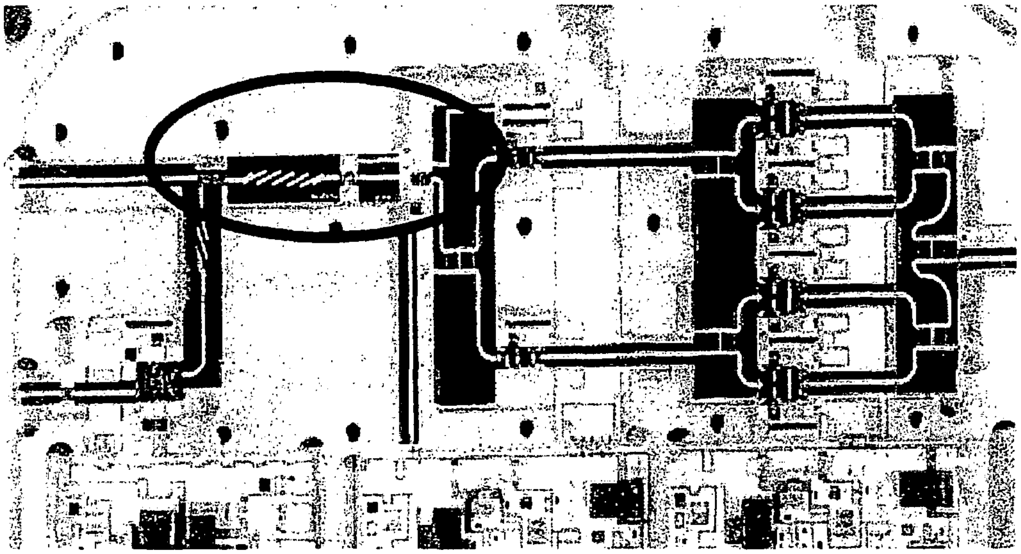
FIGS. 3 and 4 show an exemplary use of an undercut post complementary metal oxide semiconductor (CMOS) processing.
Figure 4:
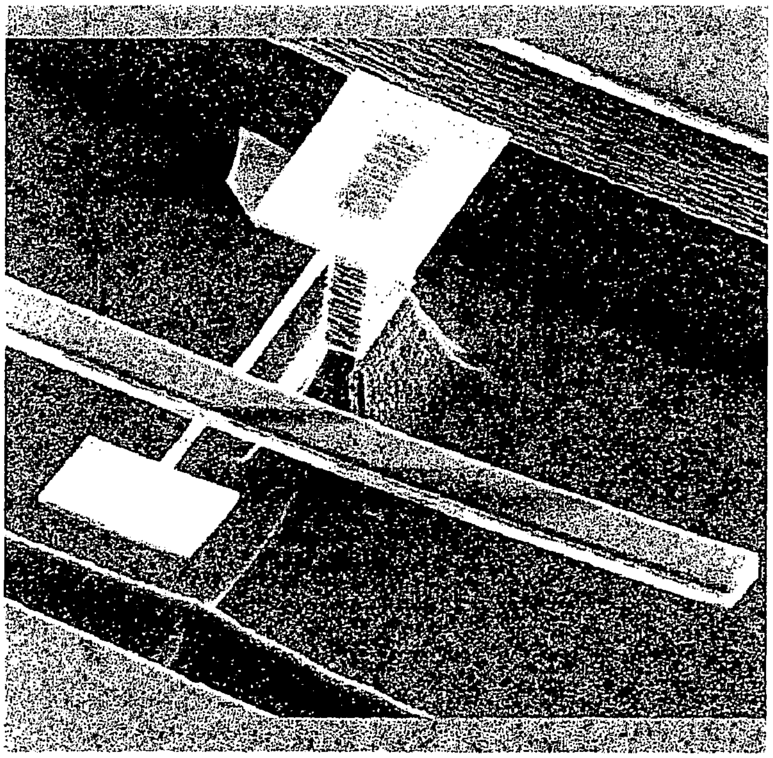

FIGS. 3 and 4 show an exemplary use of CMOS processing, or more particularly, an undercut post CMOS processing, to achieve a suspended beam of conductive material (i.e., suspended relative to an anchor post), that can serve to form any one or more of the dynamically movable conductors 105*a*-105*c*.

Figure 5A:
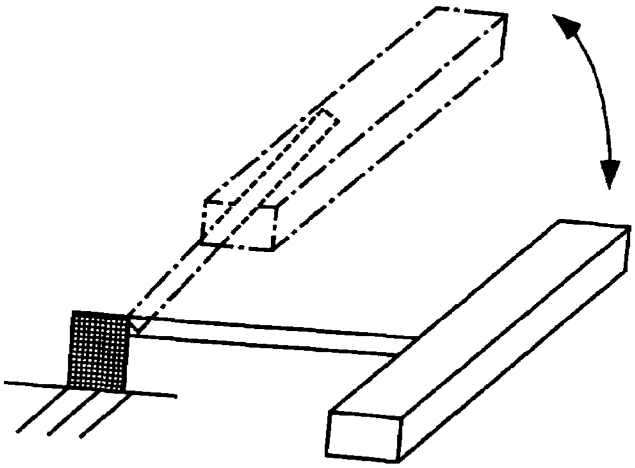
FIGS. 5*a*-5*c* illustrate exemplary uses of MEMS actuators.
Figure 5B:
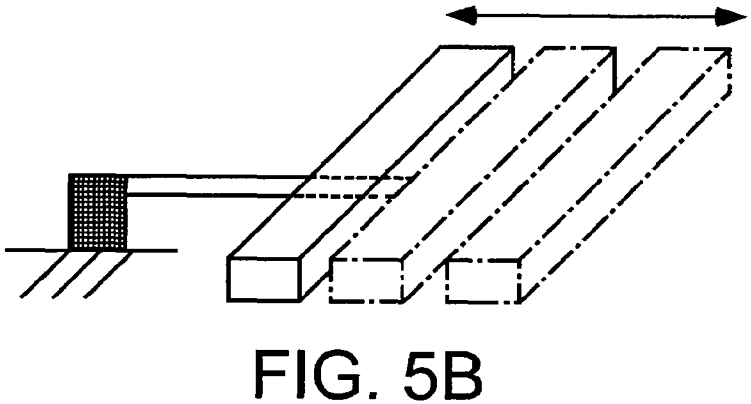
Figure 5C:
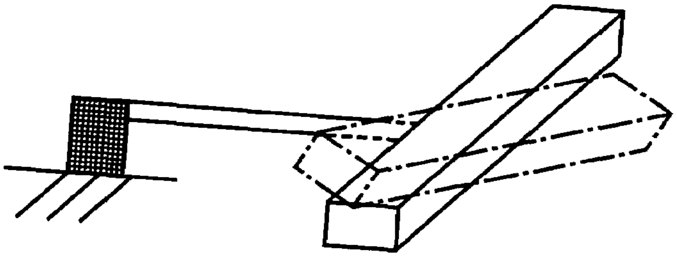

FIGS. 5*a*-5*c* illustrate the use of MEMS actuators to achieve lift, lateral movement and rotation, respectively, of a conductor for altering characteristics of a signal path in accordance with exemplary embodiments Of course, any type of motion that can be used to alter characteristics of the signal path can be incorporated into a structure designed in accordance with exemplary embodiments.

In accordance with exemplary embodiments, movement of the legs of each of the segments 105*a*-105*c* in FIG. 1 can be performed to empirically and statistically measure a resultant transfer function for each given position of the legs, such that a given movement of the conductors can be correlated to a desired response.

Exemplary embodiments can provide performance enhancement by, for example, reducing size and costs. Exemplary embodiments can use post processing of RF circuits developed using known CMOS technology to fabricate MEMS actuator RF devices. Operating parameters of an RF circuit element can be changed dynamically by post machining sections of CMOS circuit elements to form (i.e., create) the MEMS actuator. Under external excitation (e.g., thermal, electrical or otherwise), the MEMS actuator can dynamically move to change electrical parameters (e.g., coupling capacitance, inductance and so forth), which can change a transfer function of the RF device. This can result in changes of the passband response for a filter, coupling values for dividers, magnitude response for attenuators and so forth. Exemplary applications can include missile seekers, fire control radar, communications systems UAV sensors, and so forth.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of modifying a radio frequency (RF) response, comprising:

establishing an RF response in a signal path formed through plural segmented and cascaded conductive legs of a device; and controlling an actuator, which is formed by a post machining CMOS processing to be moveable, to move at least one of the conductive legs thereby structurally altering the signal path and dynamically changing an impedance of the signal path to alter the RF response.

2. The method according to claim 1, wherein modifying the RF response includes modifying at least one of the frequency, phase and amplitude of a signal received along the signal path.

3. The method according to claim 1, wherein the actuator is a microelectromechanical system device.

4. The method according to claim 1, wherein the device is at least one of a filter, a phase shifter and an attenuator.

5. The method according to claim 1, wherein the controlling to dynamically change an impedance occurs in response to an external excitation.

6. The method according to claim 1, comprising:

using undercut post CMOS processing to form the actuator, as a dynamically movable conductor.

7. An apparatus for modifying a radio frequency (RF) response comprising:

a signal path formed through plural segmented and cascaded conductive legs, the signal path having an RF transfer function; and an actuator formed by a post machining CMOS processing to be moveable for tuning the device by structurally moving at least one of the conductive legs to change the signal path and to alter the RF transfer function.

8. The apparatus according to claim 7, wherein the actuator is a microelectromechanical system device.

9. The apparatus according to claim 8, wherein the microelectromechanical system is a post machined section of a CMOS circuit.

10. The apparatus according to claim 7, wherein the signal path is a segmented path having cascaded legs, wherein coupling coefficients of the cascaded legs are altered using the actuator.

* * * * *

UNITED STATES PATENT AND TRADEMARK OFFICE

CERTIFICATE OF CORRECTION

PATENT NO. : 7,639,987 B2
APPLICATION NO. : 10/525072
DATED : December 29, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-first Day of December, 2010

David J. Kappos
*Director of the United States Patent and Trademark Office*